(12) United States Patent
Sanada

(10) Patent No.: US 10,636,259 B2
(45) Date of Patent: Apr. 28, 2020

(54) RECEIPT PRINTER

(71) Applicant: TOSHIBA TEC KABUSHIKI KAISHA, Shinagawa-ku, Tokyo (JP)

(72) Inventor: Tsuyoshi Sanada, Susono Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 196 days.

(21) Appl. No.: 15/599,703

(22) Filed: May 19, 2017

(65) Prior Publication Data
US 2017/0337786 A1   Nov. 23, 2017

(30) Foreign Application Priority Data

May 23, 2016   (JP) .................................. 2016-102282

(51) Int. Cl.
*G07G 5/00*   (2006.01)
*B41J 15/00*   (2006.01)
(Continued)

(52) U.S. Cl.
CPC ................ *G07G 5/00* (2013.01); *B41J 11/58* (2013.01); *B41J 11/70* (2013.01); *B41J 15/005* (2013.01); *B41J 15/042* (2013.01); *G06Q 20/208* (2013.01)

(58) Field of Classification Search
CPC . B41J 11/58; B41J 11/70; B41J 15/005; B41J 15/042; B41J 3/4075; B41J 15/046; G06Q 20/208; G07G 5/00
See application file for complete search history.

(56) References Cited

U.S. PATENT DOCUMENTS 5,270,731 A * 12/1993 Kerr .................... B41J 2/475
                                                        346/24
5,428,371 A *  6/1995 Fox .................... B41J 11/70
                                                        346/136
(Continued)

FOREIGN PATENT DOCUMENTS

JP       1-156166      10/1989
WO     2006/046454       5/2006

OTHER PUBLICATIONS

Extended European Search Report for European Patent Application No. 17171863.8 dated Nov. 17, 2017.
(Continued)

*Primary Examiner* — Asfand M Sheikh
*Assistant Examiner* — Avia Salman
(74) *Attorney, Agent, or Firm* — Amin, Turocy & Watson, LLP

(57) ABSTRACT

A receipt printer comprises a discharge port configured to discharge a receipt; a conveyance section configured to convey a paper; a clamping section configured to clamp the paper in the front of the discharge port; and a controller configured to control the conveyance section to discharge the paper from the discharge port. The clamping section includes a fixed section and a movable section forming a paper insertion section, and the paper is clamped by the fixed section and the movable section if the paper is inserted into the paper insertion section. A paper conveyance direction in which the paper is directed to the paper insertion section is different from a paper discharge direction in which the paper is discharged from the discharge port. The controller controls the clamping section such that a front end of the paper is clamped with the clamping section by conveying the paper towards the paper insertion section and the paper is bent into a loop shape by further conveying the paper (Continued)

towards the paper insertion section from a state in which the paper is clamped by the clamping section to be discharged from the discharge port.

5 Claims, 11 Drawing Sheets

(51) Int. Cl.
    *B41J 15/04*     (2006.01)
    *B41J 11/58*     (2006.01)
    *B41J 11/70*     (2006.01)
    *G06Q 20/20*     (2012.01)

(56) References Cited

U.S. PATENT DOCUMENTS

| | | | |
|---|---|---|---|
| 6,428,226 B1 | 8/2002 | Suzuki et al. | |
| 6,460,687 B1 * | 10/2002 | Escobedo | B41J 11/46 198/624 |
| 6,519,441 B1 * | 2/2003 | Sawada | B41J 11/48 399/384 |
| 6,554,216 B1 * | 4/2003 | Escobedo | B41J 11/46 198/624 |
| 2010/0039665 A1 * | 2/2010 | Tsukada | B41J 11/66 358/1.15 |
| 2011/0064497 A1 * | 3/2011 | Niihara | B41J 15/042 399/363 |
| 2012/0141236 A1 * | 6/2012 | Korner | B65G 1/0407 414/222.01 |
| 2013/0014624 A1 | 1/2013 | Eoka et al. | |
| 2013/0100223 A1 * | 4/2013 | Sato | G03G 15/652 347/104 |
| 2014/0253660 A1 * | 9/2014 | Amano | B41J 15/046 347/218 |
| 2015/0302380 A1 * | 10/2015 | Kalsi | G07G 1/14 705/14.23 |
| 2016/0217353 A1 * | 7/2016 | Nagashima | G06K 15/16 |

OTHER PUBLICATIONS

Chinese Office Action for Chinese Patent Application No. 201710357675.5 dated Aug. 28, 2018.

* cited by examiner

RECEIPT PRINTER

CROSS-REFERENCE TO RELATED APPLICATION

This application is based upon and claims the benefit of priority from Japanese Patent Application No. 2016-102282, filed May 23, 2016, the entire contents of which are incorporated herein by reference.

FIELD

Embodiments described herein relate generally to a receipt printer.

BACKGROUND

A commodity information processing apparatus (for example, POS terminal) is generally provided with a receipt printer for printing information such as a transaction details on a receipt. The receipt printer prints information on a rolled paper and cuts the paper to discharge it from a discharge port. At this time, there is a case in which the receipt printer cuts the paper in a manner of a so-called partial cut so that the paper (receipt) does not drop from the discharge port to an inner side (for example, a conveyance path of the paper) or an outer side (for example, floor) of the printer. In the partial cut, the paper is partially cut or separated from the rolled paper to leave a part thereof along the cutting direction when the paper becoming the receipt is separated from the rolled paper.

DETAILED DESCRIPTION

Figure 1:
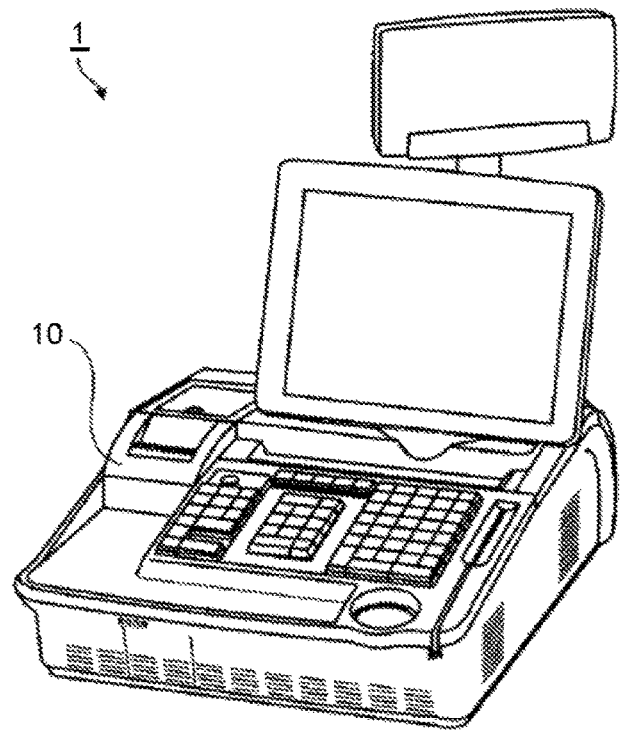
FIG. 1 is a perspective view illustrating a commodity information processing apparatus equipped with a receipt printer according to an embodiment.

In accordance with an embodiment, a receipt printer comprises a discharge port configured to discharge a receipt, a conveyance section configured to convey a paper becoming the receipt, a clamping section configured to clamp the paper at an upstream side of the discharge port in a discharge direction of the paper, and a discharge control module configured to control the conveyance section to discharge the paper from the discharge port. The clamping section is provided with a first section and a second section forming a paper insertion section to clamp the paper with the first section and the second section if the paper is inserted into the paper insertion section. The conveyance section is capable of conveying the paper towards the paper insertion section, and a paper conveyance direction in which the paper is directed to the paper insertion section is different from a paper discharge direction in which the paper is discharged from the discharge port. The discharge control module controls the clamping section such that a front end of the paper is clamped with the clamping section by conveying the paper towards the paper insertion section and the paper is bent into a loop shape by further conveying the paper towards the paper insertion section from a state in which the front end of the paper is clamped by the clamping section to be discharged from the discharge port.

Hereinafter, embodiments for realizing the invention are described with reference to the accompanying drawings. Same reference numerals are applied to the same or equivalent components in the drawings.

FIG. 1 is a perspective view illustrating a commodity information processing apparatus 1 equipped with a receipt printer 10 according to the embodiment. The commodity information processing apparatus 1 is, for example, a POS (Point Of Sales) terminal. The commodity information processing apparatus 1 is arranged at each store and is operated by an operator, e.g., store clerk. The commodity information processing apparatus 1 is connected to a store server (POS server) (not shown) via a network. The receipt printer 10 is fixed or built in the commodity information processing apparatus 1.

Figure 2:
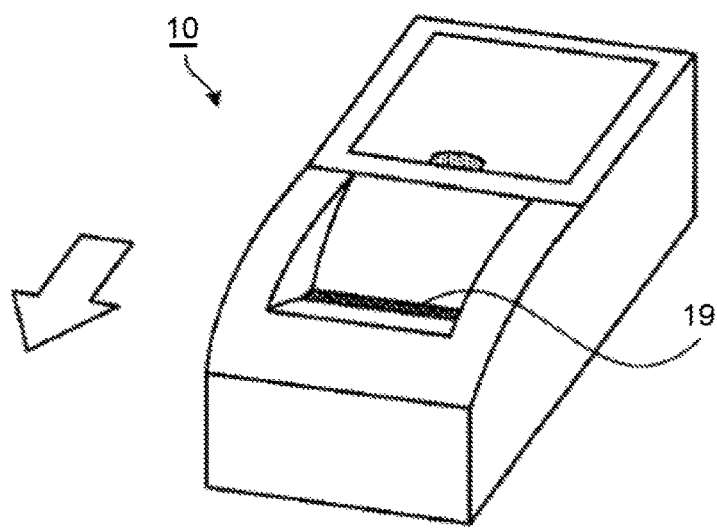
FIG. 2 is a perspective view of the receipt printer according to the present embodiment.

FIG. 2 is a view of the receipt printer 10 taken out of the commodity information processing apparatus 1. The receipt printer 10 is used to issue a receipt. The receipt printer 10 is provided with a discharge port 19 for discharging the receipt. The discharge port 19 is opened upward. The appearances shown in FIG. 1 and FIG. 2 are merely examples, and various modifications are enabled. In the following description, a front side (for example, a side where the operator stands at) of the receipt printer 10 is referred to as a "device front side", and an opposite side thereof is referred to as a "device rear side". In FIG. 2, the device front side is a direction shown by an outline arrow, and the device rear side is an opposite direction thereto.

Figure 3:
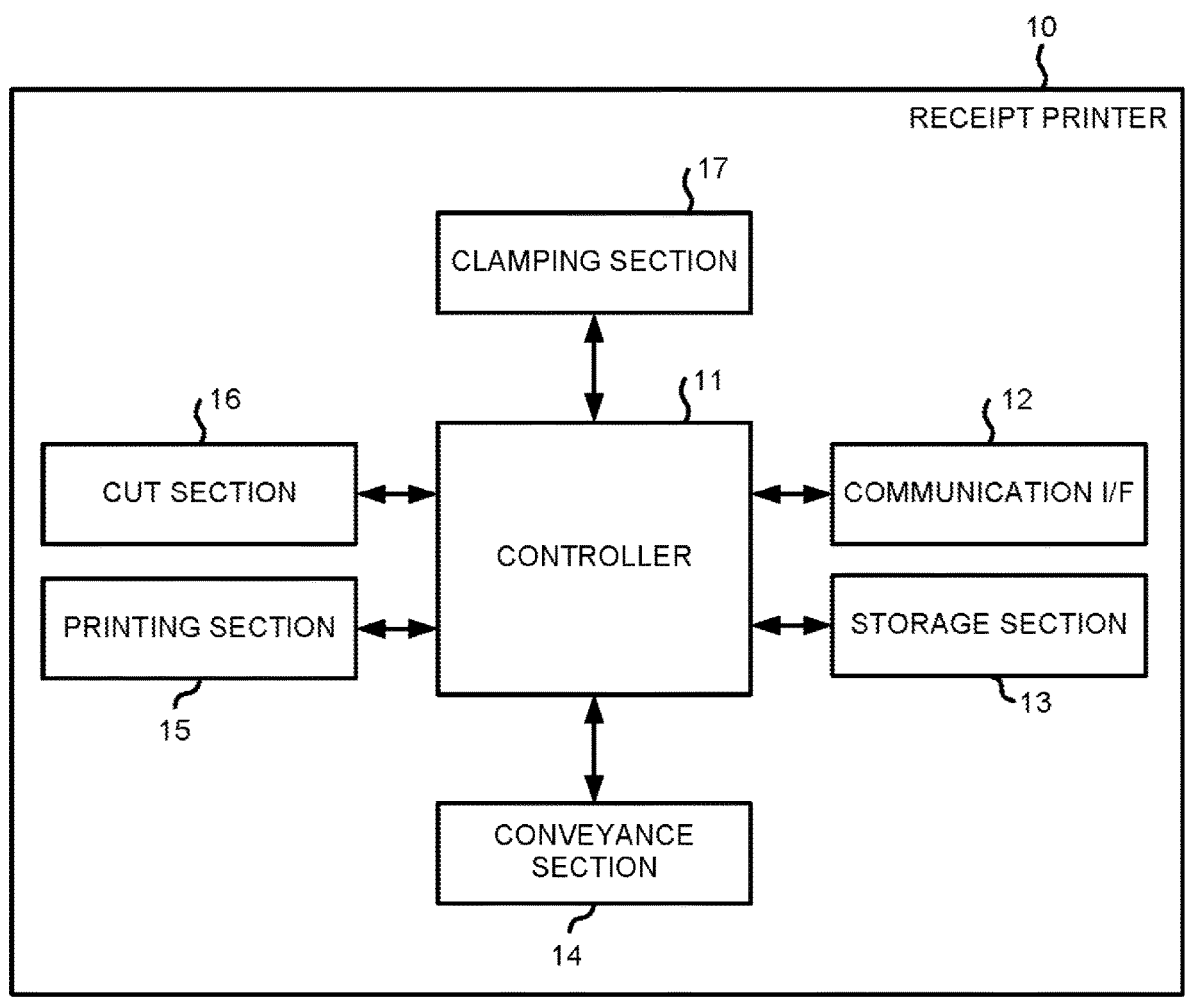
FIG. 3 is a block diagram of the receipt printer.
Figure 4:
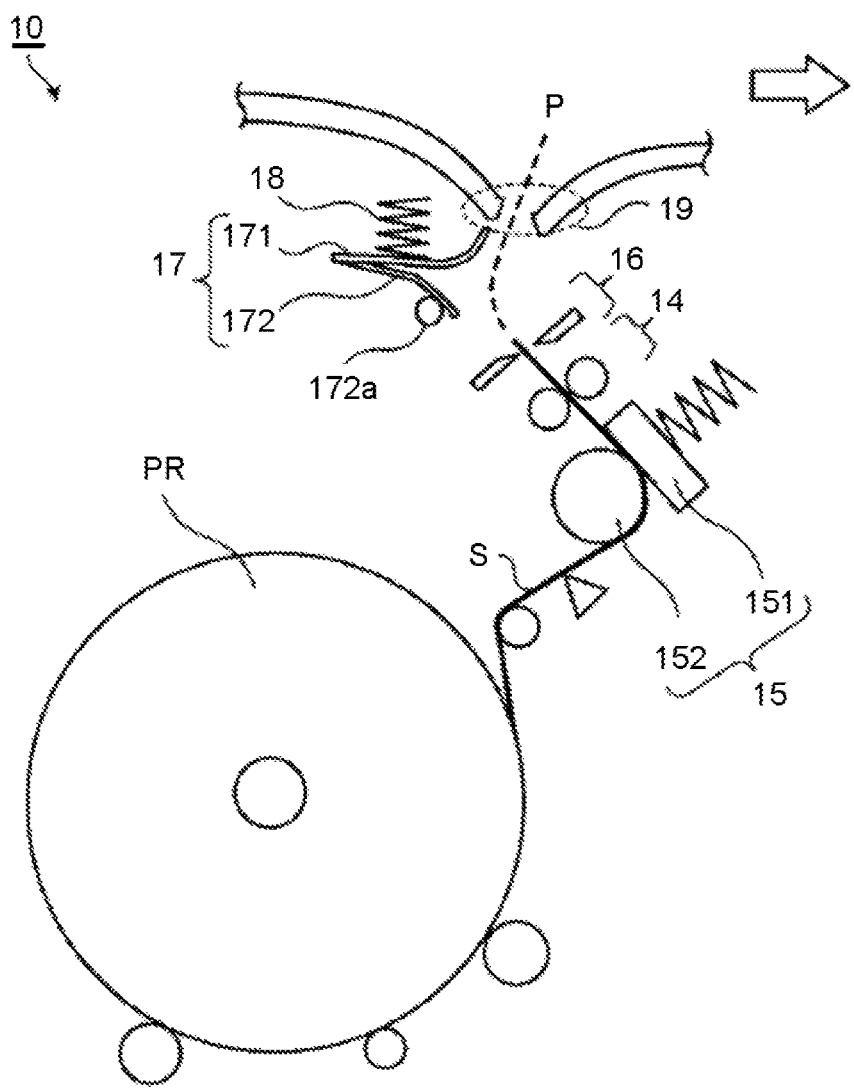
FIG. 4 is a diagram illustrating the internal structure of the receipt printer.

FIG. 3 is a block diagram of the receipt printer 10. FIG. 4 is a diagram illustrating the internal structure of the receipt printer 10. The receipt printer 10 detachably receives a rolled paper PR. The receipt printer 10 prints details on a paper S led out from the rolled paper PR to discharge the paper S from the discharge port 19 as a receipt.

As shown in FIG. 3, the receipt printer 10 is provided with a controller 11, a communication interface 12, a storage section 13, a conveyance section 14, a printing section 15, a cut section 16 and a clamping section 17.

The controller 11 is a processing device such as a processor. The controller 11 operates according to a program stored in a ROM (Read Only Memory) and a RAM (Random Access Memory) that are not shown, or the storage section 13 to realize various operations including a "receipt discharge processing" described later. The controller 11 functions as a discharge control module which controls the conveyance section 14, the cut section 16 and the clamping section 17 to discharge the paper from the discharge port.

The communication interface 12 communicates with a control device (for example, processor) of the commodity information processing apparatus 1. The communication interface 12 acquires various data from the commodity information processing apparatus 1 to transmit it to the storage section 13. The data acquired by the communication interface 12 from the commodity information processing apparatus 1 contains information (for example, transaction details) to be printed on the receipt by the printing section 15. In the following description, information printed by the printing section 15 on the receipt is referred to as a print data.

The storage section 13 is a data readable and writable storage device such as a DRAM (Dynamic Random Access Memory), an SRAM (Static Random Access Memory), a flash memory, a hard disk and the like. The storage section 13 maybe a built-in memory of the controller 11 or a memory separate from the controller 11. The storage section 13 stores information such as a transaction details received by the communication interface 12 and a program for operating the controller 11.

The conveyance section 14 is a device (or a mechanism) for conveying the paper S led out of the rolled paper PR towards the clamping section 17. As shown in FIG. 4, the conveyance section 14 is a pair of rollers arranged to face each other across a movement route of the paper S. The constitution of the conveyance section 14 is not limited to that. For example, the paper S may be conveyed by the rotation of a platen roller 152 of the printing section 15 to draw the paper S out from the rolled paper PR.

The printing section 15 is used to print various information such as transaction details on the paper S. The printing section 15 is a thermal print unit. The printing section 15 includes a thermal head 151 and the platen roller 152. The printing section 15 prints information such as a transaction details on the paper S under the control of the controller 11.

Figure 5:
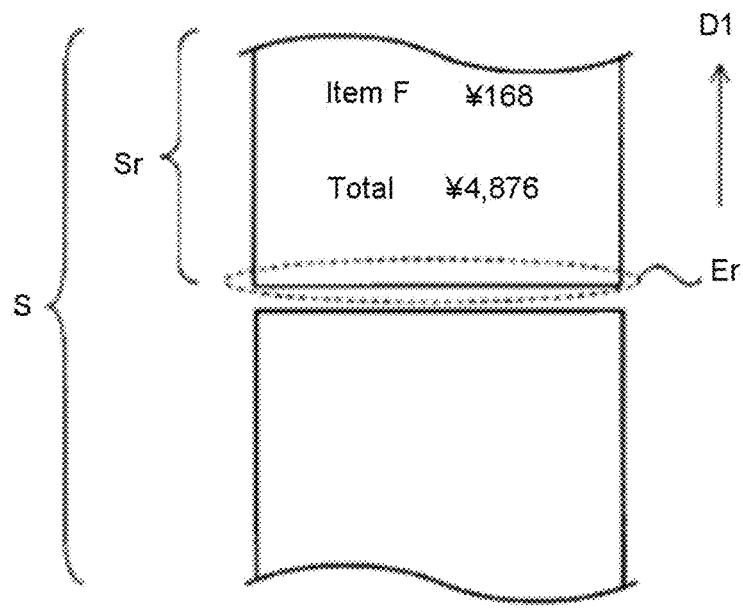
FIG. 5(A) is a diagram illustrating a state in which a paper is completely cut.
FIG. 5(B) is a diagram illustrating a state in which a paper is partially cut.
Figure 5:
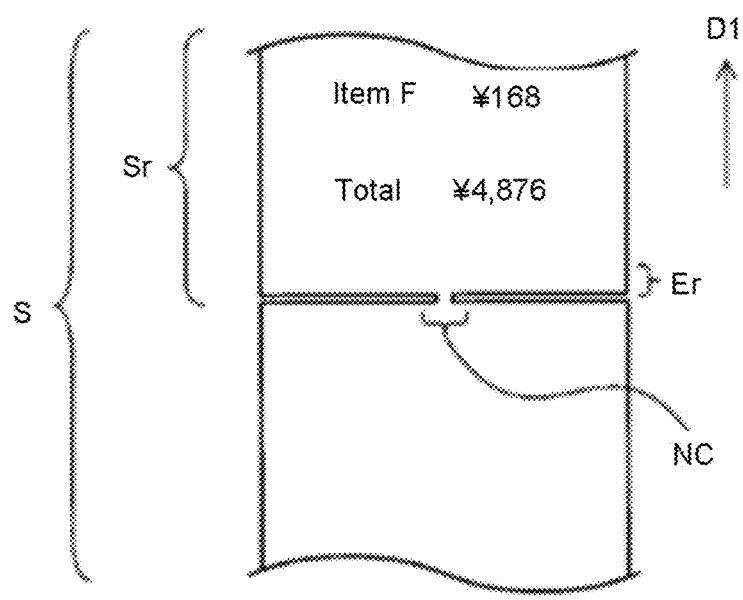

The cut section 16 is a cutter, e.g., slide type cutter, for cutting a part becoming the receipt from the paper S. Of course, the constitution of the cut section 16 is not limited to that, and various modifications are applicable. The cut section 16 enables both a full cut and a partial cut. FIG. 5(A) is a diagram illustrating a state in which the paper S is completely cut. FIG. 5(B) is a diagram illustrating a state in which the paper S is partially cut.

In the full cut, the part becoming the receipt is completely separated from the paper. For example, as shown in FIG. 5(A), a part (Er shown in FIG. 5(A)), i.e., a rear end of a receipt Sr, is completely separated from the paper S.

In the partial cut, the part becoming the receipt is partially separated from the paper. For example, as shown in FIG. 5(B), in the partial cut, the cut section completes the separation of the receipt in a state in which a part (NC shown in FIG. 5(B), hereinafter, referred to as a non-cut section) of a rear end Er of the receipt Sr remains. In this case, the operator eventually tears the non-cut section NC to separate the receipt Sr from the paper S. Further, in FIG. 5(B), the non-cut section NC is positioned at the center of the rear end Er of the receipt Sr; however, the position of the non-cut section NC is not limited to that. For example, the non-cut section NC may be positioned at a left edge and a right edge of the rear end Er. The number of the non-cut sections NC is not limited to one, and a plurality of the non-cut sections NC may be formed.

Returning to FIG. 4, the clamping section 17 clamps the paper S in the front of the discharge port 19 (upstream side in a discharge direction of the paper S). The direction shown by an outline arrow in FIG. 4 is the device front side and an opposite direction thereto is the device rear side. The clamping section 17 is arranged at a position entering the inside of the receipt printer 10 along the movement route P of the paper S from the discharge port 19. A distance from the discharge port 19 to the clamping section 17 is, for example, 1 cm~10 cm. The clamping section 17 is positioned at the device rear side of the movement route P.

Figure 6:
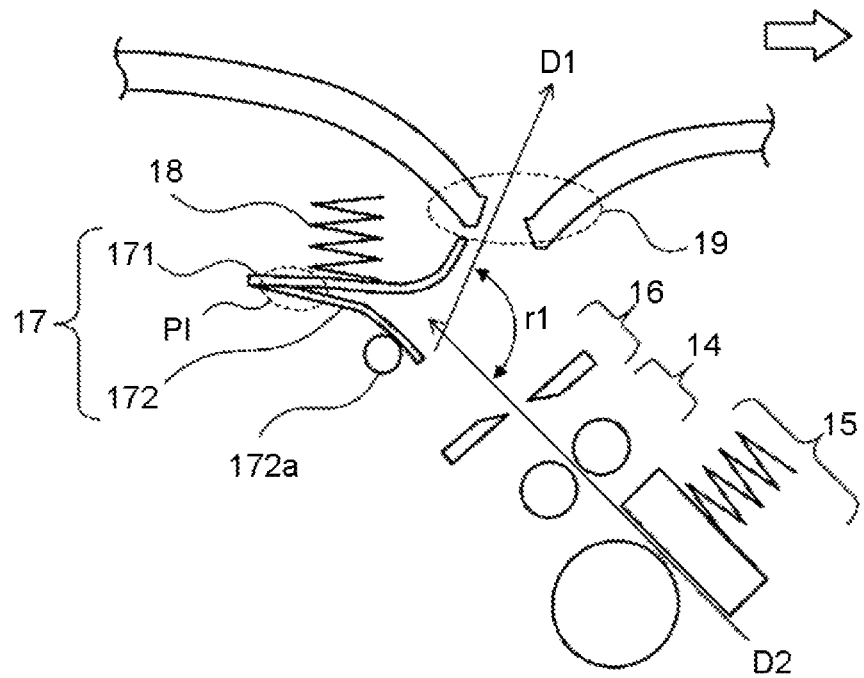
FIG. 6 is an enlarged view of the vicinity of a clamping section of the receipt printer.

FIG. 6 is an enlarged view of the vicinity of the clamping section 17 of the receipt printer 10. The clamping section 17 includes a fixed section 171 (first section) and a movable section 172 (second section).

The fixed section 171 is a fixed paper guide fixed in the receipt printer 10. The moveable section 172 is a movable paper guide rotatable around a rotation shaft 172a. Both the fixed section 171 and the movable section 172 are plate shapes. The fixed section 171 and the movable section 172 are arranged in a V-shape in such a manner that an opened part of the V-shape faces a direction opposite to a paper conveyance direction D2.

The paper conveyance direction D2 indicates a direction in which the paper S is directed to the clamping section 17. In FIG. 6, the paper conveyance direction D2 refers to a direction from the cut section 16 or the printing section 15 to the clamping section 17. The receipt printer 10 has a conveyance path of the paper S in a direction different from the paper conveyance direction D2 and a paper discharge direction D1. The paper discharge direction D1 indicates a direction in which the paper S is discharged from the discharge port 19. An angle r1 formed by the paper discharge direction D1 and the paper conveyance direction D2 is greater than 90°. In the following description, the angle r1 formed by the paper discharge direction D1 and the paper conveyance direction D2 is referred to as a paper discharge angle. The paper discharge angle r1 is an inferior angle and is smaller than 180°.

Figure 7:
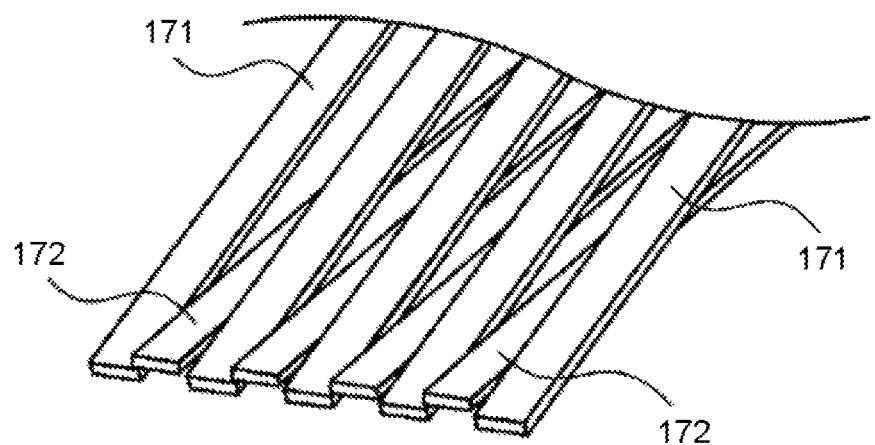
FIG. 7 is a perspective view of the vicinity of a paper insertion section of the clamping section.

FIG. 7 is an enlarged view of the vicinity of front ends at the device rear side of the fixed section 171 and the movable section 172. Comb-like convex part and concave part are respectively formed in the fixed section 171 and the movable section 172. The fixed section 171 and the movable section 172 are arranged in such a manner that the convex part and the concave part of respective sections 171 and 172 are engaged with each other.

Figure 8:
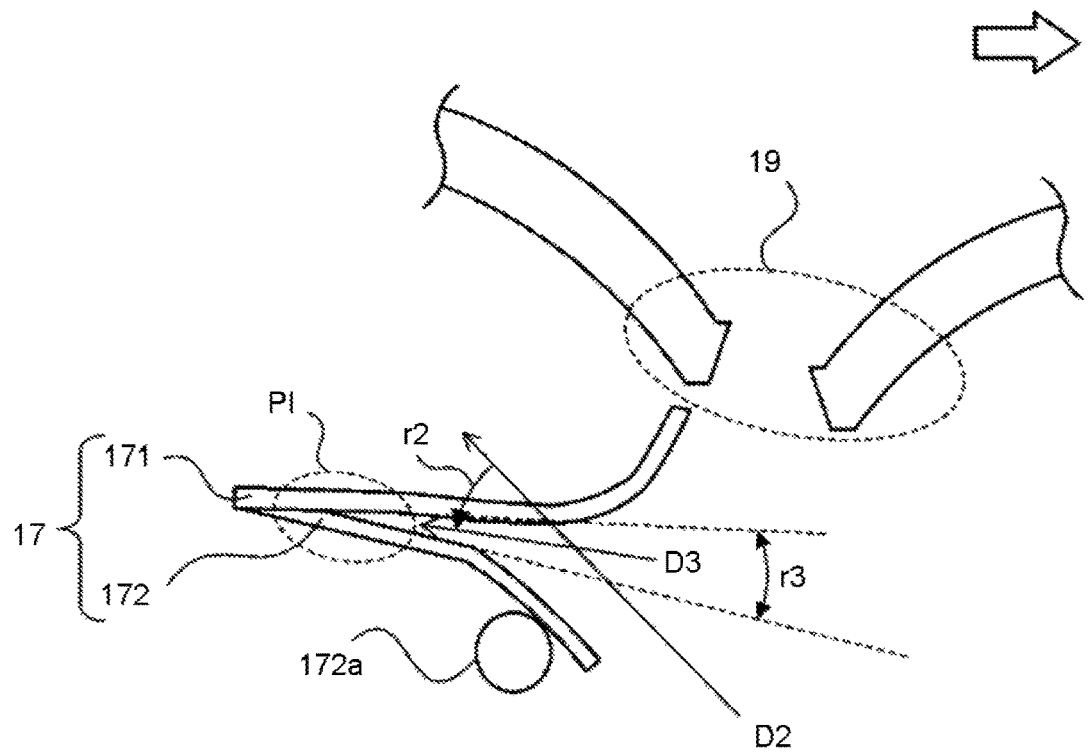
FIG. 8 is an enlarged view of the clamping section shown in FIG. 6.

FIG. 8 is an enlarged view of the clamping section 17 shown in FIG. 6. A front end part, i.e., front end part of V shape, at the device rear side of the fixed section 171 and the movable section 172 is formed into an acute angle. The acute angle part is a paper insertion section PI. An angle r3 of the acute angle part is, for example, in a range of 1~30°. The fixed section 171 and the movable section 172 respectively curve towards sides opposite to the facing sections so that the paper is easily inserted into the paper insertion section PI. The fixed section 171 curves towards the discharge port 19 and the movable section 172 is warped downward.

An elastic body 18 for applying pressure to the fixed section 171 is mounted on the fixed section 171. The elastic body 18 functions as an energization module for energizing the fixed section 171 towards the movable section 172. The fixed section 171 is slightly movable towards the movable section 172. As stated above, respective ends of the fixed section 171 and the movable section 172 are engaged at the paper insertion section PI side. The elastic body 18 applies pressure to the fixed section 171, and in this way, a proper clamping force is applied to the paper S at the time the paper S is inserted into the paper insertion section PI.

In the following description, the direction, i.e., D3 shown in FIG. 8, in which the paper S is inserted into the paper insertion section PI is referred to as a paper insertion direction. The paper insertion direction D3 is inclined by about r2 with respect to the paper conveyance direction D2. The inclined direction thereof is opposite to the direction in which the discharge port 19 is provided. The r2 is smaller than 90° and is, for example, in a range of 1~60°.

Figure 9:
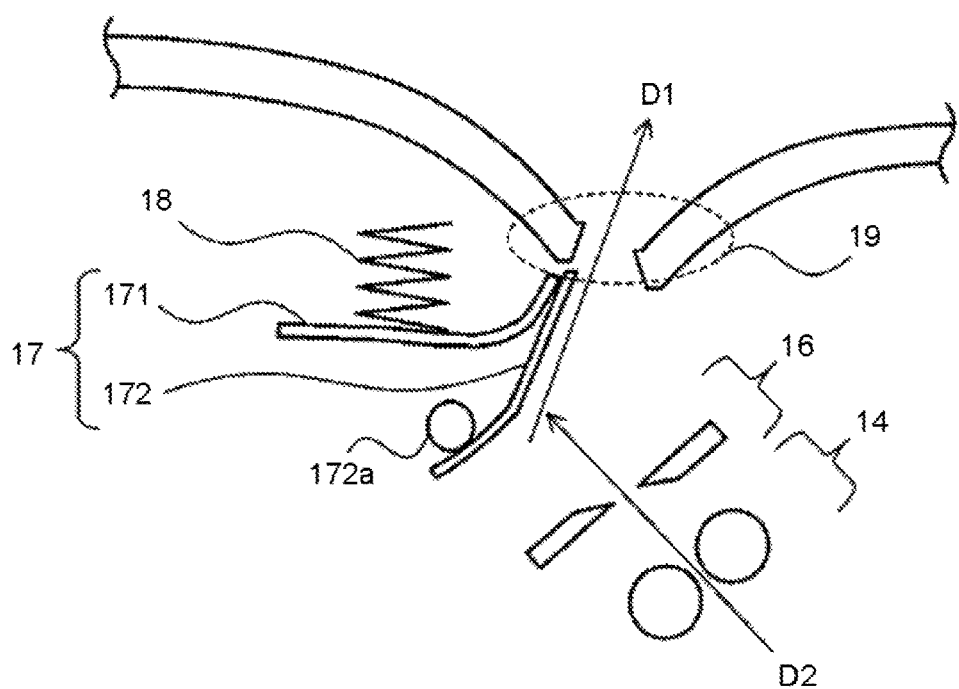
FIG. 9 is a diagram illustrating a state in which the clamping section deforms a shape thereof.

As described above, the movable section 172 is rotatable around the rotation shaft 172a. The movable section 172 rotates under the control of the control section 11. With the rotation of the movable section 172, the clamping section 17 changes the shape thereof from a shape (first shape) that enables the paper S to be inserted to another shape (second shape). FIG. 9 is a diagram illustrating a state in which the clamping section 17 deforms the shape thereof. The movable section 172 rotates until a part thereof constituting the paper insertion section PI is substantially parallel to the paper discharge direction D1. As a result, a route is formed in which the paper S is directed to the discharge port 19. In the following description, a shape (second shape) that blocks the paper from entering the paper insertion section PI but guides the paper towards the discharge port 19 as shown in FIG. 9 is referred to as a paper direct discharge shape. Further, for example, a shape (first shape) that permits a paper S to enter the paper insertion section PI as shown in FIG. 8 is referred to as a paper insertable shape.

An operation of the receipt printer 10 having such an above constitution is described.

Figure 10:
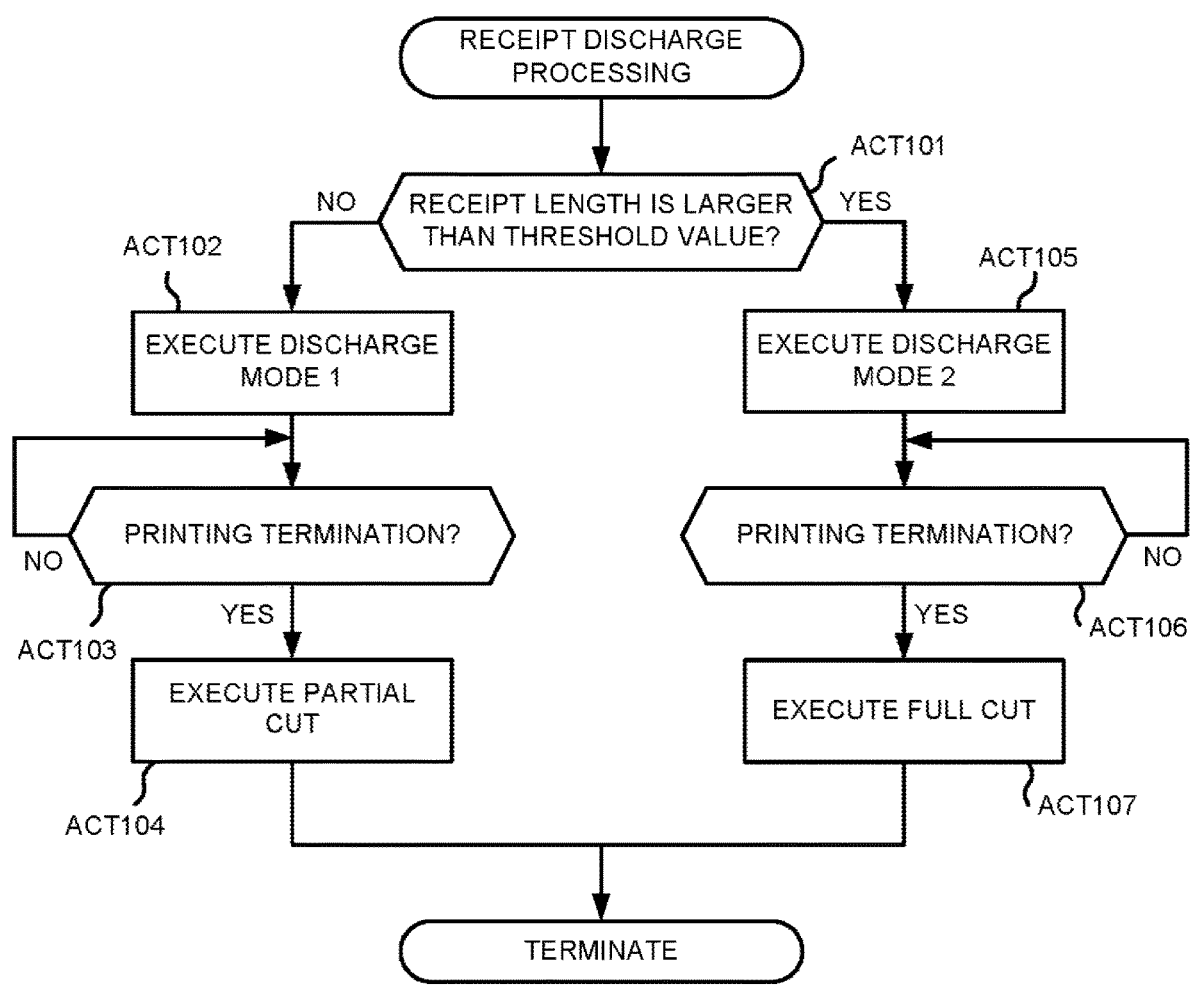
FIG. 10 is a flowchart illustrating a receipt discharge processing according to the present embodiment.

The controller 11 of the receipt printer 10 starts a receipt discharge processing if receiving a printing start command from the commodity information processing apparatus 1. As stated above, data to be printed on the receipt, i.e., print data, is stored in the storage section 13. Hereinafter, the receipt discharge processing is described with reference to the flowchart in FIG. 10.

The controller 11 determines whether a length of the receipt is greater than a preset threshold value (ACT 101). At this time, the controller 11 determines the length of the receipt on the basis of the print data stored in the storage section 13. For example, the controller 11 determines the length of the receipt from the number of printing lines and a width of each line.

Figure 11:
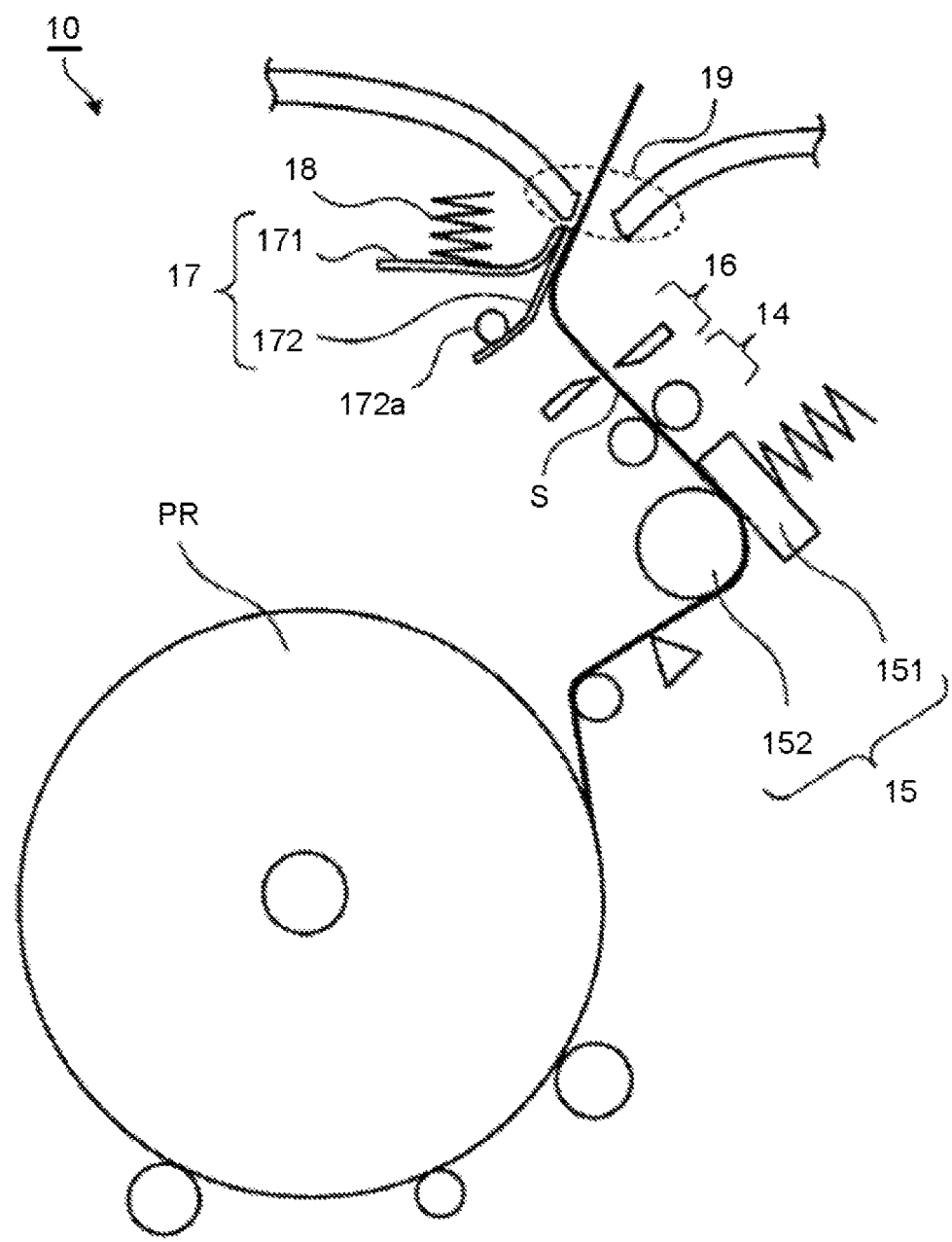
FIG. 11 is a diagram illustrating a state in which the paper is directly discharged from a discharge port without clamping a front end of the paper by the clamping section.

If the length of the receipt is smaller than the preset threshold value (No in ACT 101), the controller 11 executes a discharge mode 1 (ACT 102). In the discharge mode 1, the paper S is discharged from the discharge port 19 without being clamped by the clamping section 17. FIG. 11 is a diagram illustrating a state in which the paper S is discharged in the discharge mode 1. The controller 11 rotates the movable section 172 to change the shape of the clamping section 17 to a paper direct discharge shape (second shape). The controller 11 controls the printing section 15 to print information on the paper S while controlling the conveyance section 14 to convey the paper S. The paper S is guided to the movable section 172 to be directly discharged from the discharge port 19.

The controller 11 determines whether the printing is completed (ACT 103). If the printing is not completed (No in ACT 103), the controller 11 returns to the processing in ACT 102 to continue the printing operation and the discharge operation. If the printing is completed (Yes in ACT 103), the controller 11 controls the cut section 16 to separate the part becoming the receipt from the paper S. At this time, the controller 11 carries out the partial cut so that a paper jam caused by the receipt drop to the inside of the receipt printer 10 does not occur. As shown in FIG. 5(B), in the partial cut, the part becoming the receipt is partially cut from the paper S. If the receipt is short, even if the controller 11 executes the partial cut, there is rare possibility of tearing the receipt with its own weight.

Returning to ACT 101 in FIG. 10, if the length of the receipt is greater than the preset threshold value (Yes in ACT 101), the controller 11 executes a discharge mode 2 (ACT 105). In the discharge mode 2, the paper S is bent into the loop shape to be discharged from the discharge port 19.

Figure 12:
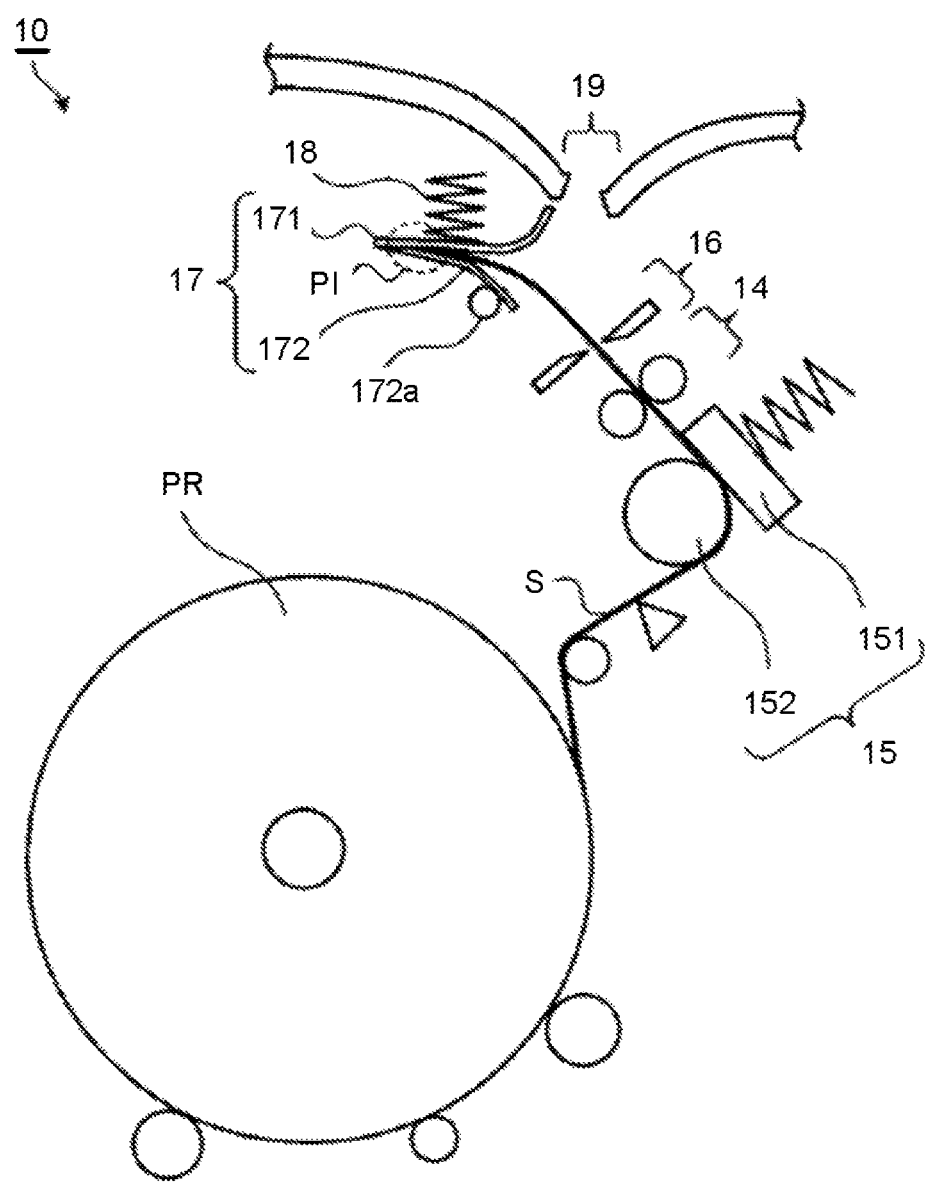
FIG. 12 is a diagram illustrating a state in which the front end of the paper is clamped by a fixed section and a movable section.
Figure 13:
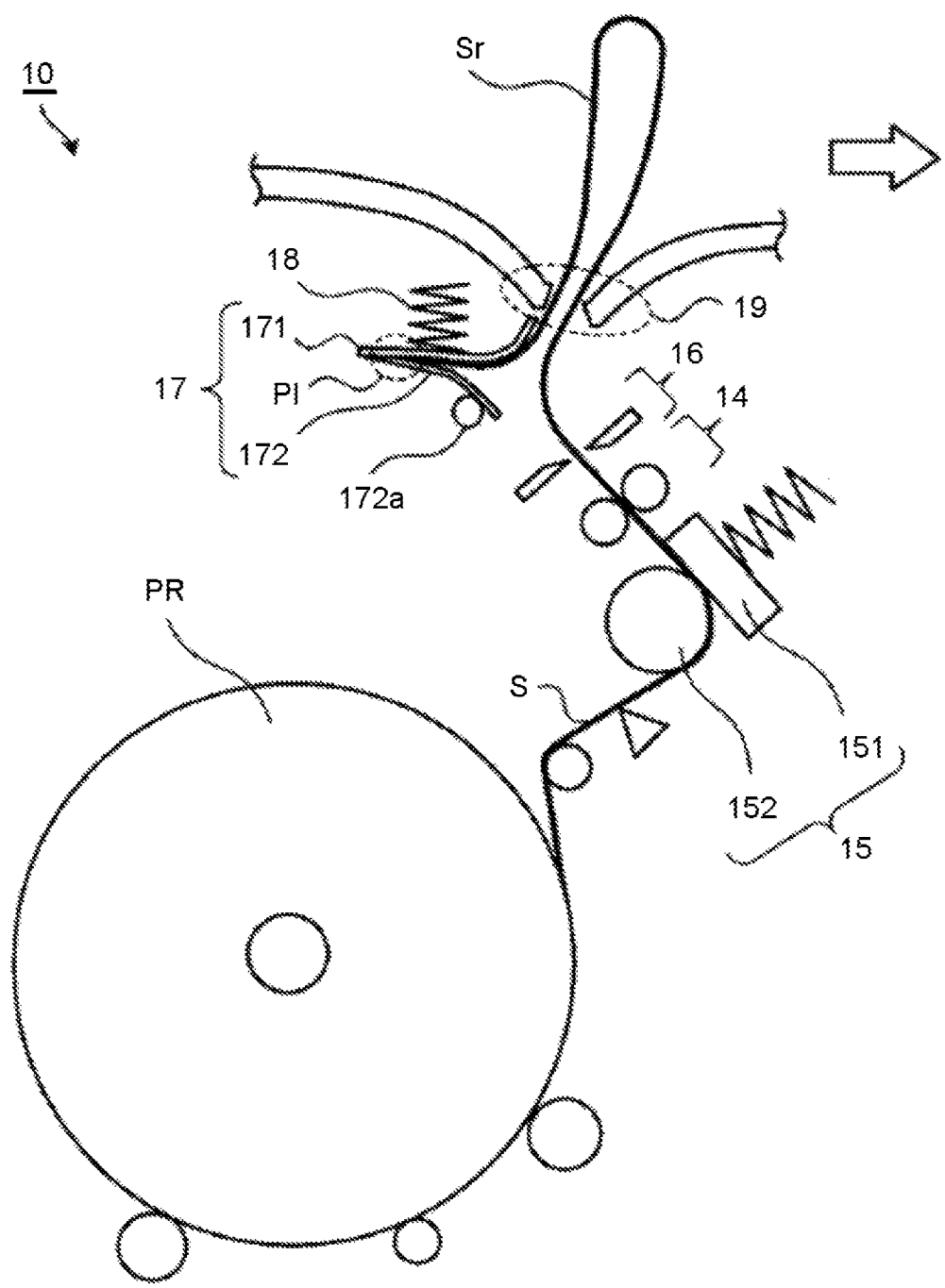
FIG. 13 is a diagram illustrating a state in which the paper is discharged from the discharge port in a state of being bent into a loop shape.

FIG. 12 is a diagram illustrating a state in which the paper S is discharged in the discharge mode 2. The controller 11 rotates the movable section 172 to change the shape of the clamping section 17 to the paper insertable shape (first shape). The controller 11 controls the conveyance section 14 to convey the paper S towards the paper insertion section PI. At the same time, the controller 11 controls the printing section 15 to print information on the paper S. The controller 11 continues to convey the paper S to insert the front end of the paper S to the paper insertion section PI and enables the clamp section 17 to clamp the front end of the paper. The controller 11 further conveys the paper S towards the paper insertion section PI from a state in which the front end of the paper S is clamped by the clamping section 17. In this way, the paper S is bent into the loop shape to be discharged from the discharge port 19. At this time, the controller 11 may print information on the paper S and convey the paper S at a higher speed compared with the discharge mode 1, and may discharge the paper S at the higher speed compared with the discharge mode 1. FIG. 13 is a diagram illustrating a state in which the paper S is discharged from the discharge port 19 in a state of being bent into the loop shape.

Furthermore, the paper conveyance direction D2 and the paper discharge direction D1 are opposite directions as shown in FIG. 6. The paper insertion direction D3 is inclined with respect to the paper conveyance direction D2 as shown in FIG. 8, and the inclined direction thereof is opposite to the direction in which the discharge port 19 is provided. Thus, the controller 11 can smoothly bend the paper S into the loop shape only by continuing the conveyance of the paper S after the front end of the paper S is clamped by the clamping section 17.

Figure 14:
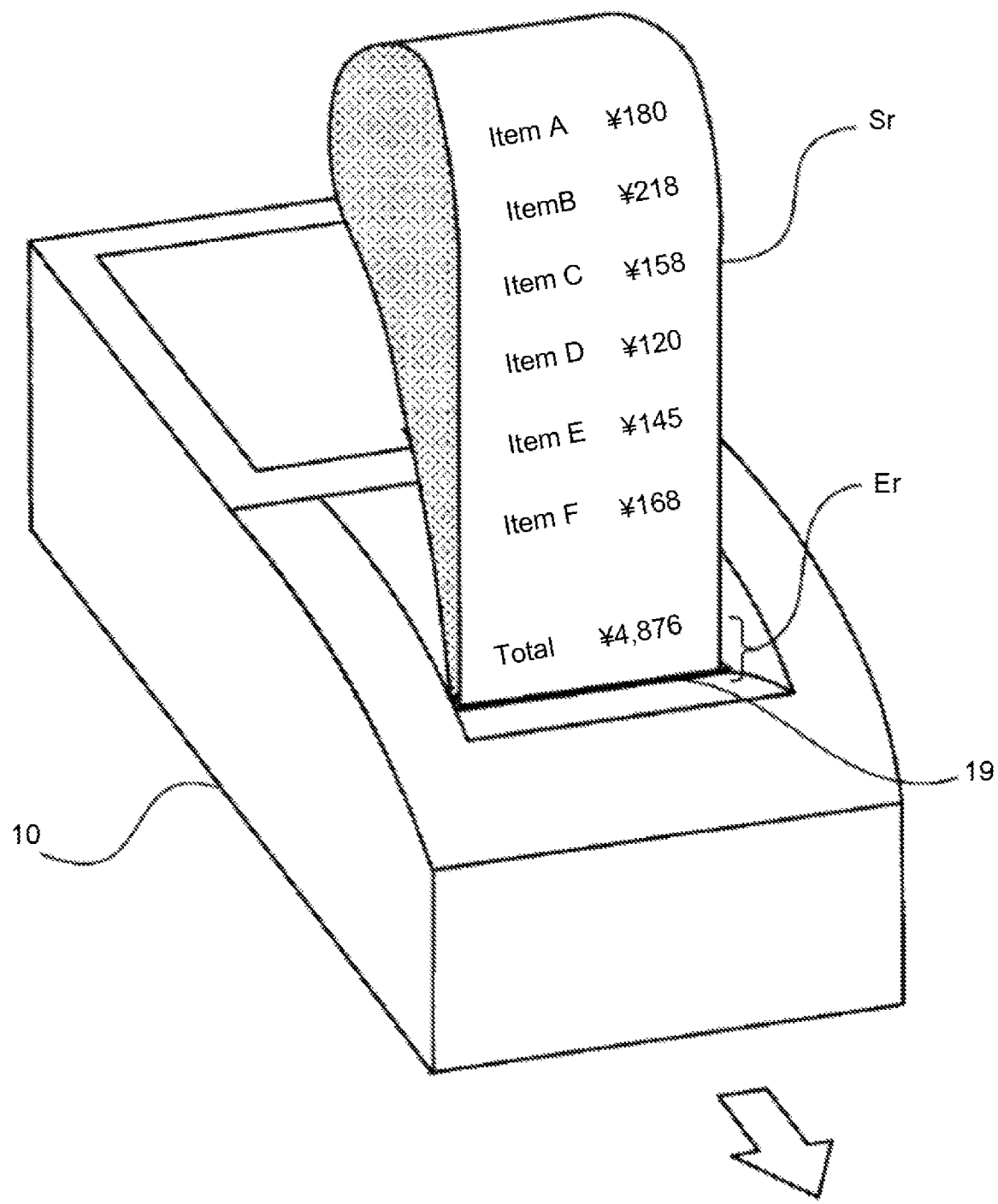
FIG. 14 is a diagram illustrating a state in which information is printed on an outer surface side of the receipt.

The printing section 15 is arranged to execute the printing on an outer surface side of front and back surfaces of the paper S at the time the paper S is bent into the loop shape to be discharged from the discharge port 19. FIG. 14 is a diagram illustrating a state in which information is printed on the outer surface side of the receipt Sr. In the case of the receipt printer 10 of the present embodiment, the device front side of the paper S located in the movement route P becomes the outer surface. Thus, the printing section 15 is arranged such that the thermal head 151 is located at the device front side (diagonally right upper side in the drawing) of the movement route P as shown in FIG. 4.

The clamping section 17 is arranged to clamp the front end of the paper S at the device rear side of the movement route P of the paper S. Thus, at the time the paper S is discharged from the discharge port 19 in a state in which the paper is bent into the loop shape, the rear end Er of the receipt Sr is located at the device front side as shown in FIG. 14.

Returning to FIG. 10, the controller 11 determines whether the printing is completed (ACT 106). If the printing is not completed (No in ACT 106), the controller 11 returns to the processing in ACT 105 to continue the printing operation and the discharge operation. If the printing is completed (Yes in ACT 106), the controller 11 controls the cut section 16 to separate the part becoming the receipt from the paper S. At this time, the controller 11 carries out the full cut so that the rear end of the receipt is neatly cut (ACT 107). As stated above, in the full cut, the part becoming the receipt Sr is completely cut from the paper S as shown in FIG. 5(A).

After the separation of the part becoming the receipt is completed, the controller 11 terminates the receipt discharge processing.

In accordance with the present embodiment, the receipt printer 10 bends the paper S into the loop shape to discharge it from the discharge port 19 by clamping the front end of the paper S in the front of the discharge port 19 if at least the length of the receipt is longer than a preset length. As the front end of the paper S is clamped, even if the receipt printer 10 completely cuts the paper S, the receipt Sr rarely falls out of the discharge port 19. Of course, even if the receipt printer 10 partially cuts the paper S, the receipt Sr rarely falls out of the discharge port 19.

In the case in which the receipt printer 10 discharges the paper S from the front end at a high speed, the front end of the paper S unexpectedly and quickly approaches the user, which may cause discomfort to the user. However, in a case in which the receipt printer 10 discharges the receipt in a state in which the receipt is bent into the loop shape, even if the paper S is discharged at a high speed, the user does not have an unpleasant feeling. Therefore, since the receipt printer 10 bends the receipt into the loop shape to discharge it, the receipt printer 10 can discharge the receipt at a high speed. The discharge time is shortened, and thus the time required for executing a settlement processing by the operator can also be shortened.

Generally, if the receipt is long, the operator hands over the receipt to a customer in a state of lightly folding the receipt in half. The receipt printer 10 of the present embodiment bends the receipt into the loop shape to discharge it from the discharge port 19 if the receipt is long. Thus, the operator can easily fold the long receipt in half by sandwiching a middle part of the loop-like receipt from the front and back sides thereof and pulling it out from the discharge port 19. At this time, the operator may further fold the receipt in the folded state in half to fold the receipt in four. Because it does not take much time to fold the receipt in half or in four, it is possible to realize improvement in the settlement processing by the operator.

In a case in which the length of the receipt is shorter than the preset length, and the clamping section 17 does not clamp the front end of the paper S, as in the past, the receipt printer 10 partially cuts the paper S. Thus, the receipt rarely falls out of the discharge port 19. If the length of the receipt is shorter than the preset length, the receipt printer 10 discharges the receipt Sr from the discharge port 19 without clamping the receipt Sr by the clamping section 17. Thus, by bending the short receipt into the loop shape, the situation that the operator is unlikely to pick up the receipt does not occur.

In a case in which the receipt printer 10 carries out the partial cut, the operator must tear the non-cut section NC to take the receipt out of the discharge port 19. In this case, as a part of the non-cut section NC becomes rough, the rear end Er of the receipt is not smooth. However, the receipt printer 10 of the present embodiment completely cuts the paper S if the front end of the paper S is clamped by the clamping section 17. Thus, if at least the front end of the paper S is clamped by the clamping section 17, the rear end Er of the receipt is straight and smooth.

The printing section 15 of the receipt printer 10 is arranged to carry out printing on the outer surface side of the front and back surfaces of the paper S at the time the paper S is bent into the loop shape to be discharged from the discharge port 19. Thus, the operator can visually confirm information printed on the receipt in a state in which the receipt is located at the discharge port 19.

The clamping section 17 of the receipt printer 10 is arranged so that the rear end Er of the receipt is located at the device front side at the time the paper S is discharged from the discharge port 19 in the loop state. In many cases, a total amount (purchase amount), a deposited amount and a change amount are printed at the last part of the receipt. Thus, the rear end Er of the receipt is located at the device front side, and in this way, the operator can confirm the total amount and the like printed on the receipt while the receipt is located at the discharge port 19.

The above embodiment is described merely as an example, and various medications and applications are applicable.

For example, in the above-described embodiment, the elastic body 18 is fixed in the fixed section 171 (first section), and energizes the fixed section 171 towards the movable section 172 (second section). However, the elastic body 18 is fixed in the movable section 172 (second section) and may energize the movable section 172 towards the fixed section 171 (first section). Further, the energization module for energizing the first section towards the second section or energizing the second section towards the first section is not limited to the elastic body. For example, a motor for rotating the movable section 172 may be utilized as the energization module. The energization module may be mounted on both the first section and the second section. Of course, the energization module may not be mounted on both the first section and the second section.

In the above embodiment, the first section is the fixed section and the second section is the movable section, and vice versa. However, both of the first section and the second section may be movable sections. The first section and the second section may operate to change the shape of the clamping section 17 from the paper insertable shape (first shape) to the paper direct discharge type (second shape), or from the paper direct discharge shape to the paper insertable shape. Of course, both the first section and the second section may be fixed sections. At this time, the clamping section 17 may not be able to change the shape thereof. The clamping section 17 may simply form the paper insertion section PI (acute section) between the first section and the second section.

In the above-described embodiment, the receipt printer 10 completely cuts the paper S if the front end of the paper S is clamped by the clamping section 17. However, the receipt printer 10 may partially cut the paper S even if the front end of the paper S is clamped by the clamping section 17.

In the above embodiment, the receipt printer 10 directly discharges the receipt Sr from the discharge port 19 without clamping the front end of the paper S by the clamping section 17 if the length of the receipt is smaller than the present threshold value. However, the receipt printer 10 may bend the paper S into the loop shape by clamping the front end of the paper S with the clamping section 17 to discharge it from the discharge port 19 if the length of the receipt is smaller than the preset threshold value.

In the above embodiment, the discharge port 19 is opened upward; however, the discharge port 19 may be not necessarily opened upward. For example, the discharge port 19 may be opened in a horizontal direction.

In the above embodiment, the printing section 15 is a thermal print unit; however, the printing section 15 is not limited to the thermal print unit. For example, the printing section 15 may be an impact dot type, an ink jet type, or an electrophotographic print unit.

In the above embodiment, the receipt printer 10 is fixed or built in the commodity information processing apparatus 1; however, the receipt printer 10 may be attached to the commodity information processing apparatus 1. For example, the receipt printer 10 may have a connection interface such as a USB (Universal Serial Bus) or the like to be capable of being connected to the commodity information processing apparatus 1 by a communication cable such as a USB cable or the like.

The receipt printer 10 may have a user interface and operate as a single unit independent of the commodity information processing apparatus 1. The receipt printer 10 may also be connected to a personal computer to operate according to an instruction of the personal computer.

In the above embodiment, the receipt printer 10 is fixed or built in the commodity information processing apparatus 1. However, the commodity information processing apparatus 1 may directly issue the receipt without passing through the receipt printer 10. For example, the commodity information processing apparatus 1 may include the controller (discharge control module) 11, the communication interface 12, the storage section 13, the conveyance section 14, the printing section 15, the cut section 16, the clamping section 17, the elastic body (energization module)18 and the discharge port 19. The controller 11 is common to a control device (for example, a processor) for controlling each section of the commodity information processing apparatus 1.

In the above embodiment, the commodity information processing apparatus 1 is the POS terminal; however, the commodity information processing apparatus 1 is not limited to the POS terminal. For example, the commodity information processing apparatus 1 may be a stand-alone cash register which does not have a network connection function.

In the above embodiment, the receipt printer 10 is installed in the POS terminal or the stand-alone cash register; however, the device in which the receipt printer 10 is installed may be other devices such as a vending machine.

The control device for controlling the receipt printer 10 or the commodity information processing apparatus 1 according to the present embodiment may be realized by a dedicated computer system or by a general computer system. For example, a program for executing the above-described operation may be stored in a computer-readable recording medium such as an optical disk, a semiconductor memory, a magnetic tape, a flexible disk and the like to be distributed, and the program may be installed in the computer to execute the above processing to constitute the control device. At this time, the control device may be a computer (processor) included in the receipt printer 10 or the commodity information processing apparatus 1, or may be a computer for controlling the receipt printer 10 or the commodity information processing apparatus 1 from the outside. Further, the above program may be stored in a disk device included in a server device on a network such as the Internet to be capable of being downloaded to a computer or the like. Further, the above-described function may be realized by cooperation of an OS (Operating System) and application software. In this case, a part other than the OS may be stored in the medium to be distributed, or may be stored in the server device to be capable of being downloaded to the computer.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A receipt printer, comprising:
a discharge port configured to discharge a receipt;
a conveyance section configured to convey a paper becoming the receipt;
a clamping section provided on a paper convey path to the discharge port from the conveyance section and configured to clamp the paper; and
a control module configured to control the conveyance section to discharge the paper from the discharge port to an outer of the printer, wherein
the clamping section is provided with a first section and a second section forming a paper insertion section, and clamps a front end of the paper inserted into the paper insertion section with the first section and the second section, wherein
a first paper conveyance direction in which the paper is directed to the paper insertion section is different from a second paper conveyance direction in which the paper is directed to the discharge port from the clamping section, wherein
the control module is configured to:
control the clamping section to be inserted the front end of the paper into the paper insertion section and to clamp the front end of the paper with the first section and the second section, and
control the conveyance section to continue conveying the paper on an upstream side of the front end being clamped at the clamp section in the first paper conveyance direction to the second paper conveyance direction downstream side, and wherein
the paper with the front end being clamped and being continually conveyed by the conveyance section is discharged bent into a loop shape from the discharge port.

2. The receipt printer according to claim 1, wherein
the first paper conveyance direction and the second paper conveyance direction forms a paper discharge angle greater than 90°, and
a paper insertion direction in which the paper is inserted into the paper insertion section is inclined with respect to the first paper conveyance direction, and the inclined direction thereof is opposite to the direction in which the discharge port is provided.

3. The receipt printer according to claim 1, wherein
at least one of the first section and the second section is a movable section that moves between a first state forming the paper insertion section and a second state not forming the paper insertion section to guide the paper.

4. The receipt printer according to claim 1, further comprising:

a printing section provided upstream of the clamping section in the paper conveyance direction and configured to print information on the paper, wherein the printing section carries out printing on a surface of the paper, the surface is an outer surface side of the part of the paper which is bent into the loop shape when discharged from the discharge port.

5. The receipt printer according to claim 1, further comprising an elastic body configured to apply a pressure to one of the first and second sections to clamp at front end of the paper inserted into the paper insertion section.

* * * * *